US006274528B1

United States Patent
Labasque et al.

(10) Patent No.: US 6,274,528 B1
(45) Date of Patent: Aug. 14, 2001

(54) PROCESS FOR MANUFACTURING PARTICLES OF X ZEOLITE EXCHANGED WITH METAL CATIONS

(75) Inventors: Jacques Labasque, Versailles; Bernard Lledos, Guyancourt; Serge Moreau, Velizy Villacoublay, all of (FR)

(73) Assignee: L'Air Liquide, Societe Anonyme pour l'Etude et l'Expoitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/379,319

(22) Filed: Aug. 23, 1999

(30) Foreign Application Priority Data

Aug. 21, 1998 (FR) .................................................. 9810621

(51) Int. Cl.[7] .................................................. B01J 29/08
(52) U.S. Cl. .................................................. 502/79; 502/64
(58) Field of Search ................................ 502/60, 64, 79; 95/130, 902

(56) References Cited

U.S. PATENT DOCUMENTS

| 5,174,979 | | 12/1992 | Chao et al. . | |
|---|---|---|---|---|
| 5,268,023 | | 12/1993 | Kirner . | |
| 5,658,370 | * | 8/1997 | Vigor et al. | 95/96 |
| 5,916,836 | * | 6/1999 | Toufar et al. | 502/86 |
| 5,919,287 | * | 7/1999 | Moreau | 95/130 |
| 5,922,107 | * | 7/1999 | Labasque et al. | 95/96 |
| 5,962,358 | * | 10/1999 | Hees et al. | 502/67 |
| 6,053,966 | * | 4/2000 | Moreau et al. | 95/96 |
| 6,083,301 | * | 7/2000 | Gary et al. | 95/130 |

FOREIGN PATENT DOCUMENTS

| 0 827 771 | 3/1998 | (EP) . |
|---|---|---|
| 0 855 209 | 7/1998 | (EP) . |

* cited by examiner

Primary Examiner—Steven P. Griffin
Assistant Examiner—Christina Ildebrando
(74) Attorney, Agent, or Firm—Young & Thompson

(57) ABSTRACT

A process for manufacturing particles of type X zeolite exchanged with at least lithium cations and having an Si/Al ratio less than or equal to 1.5, in which (a) at least one mother liquor containing lithium salts having a molar purity in excess of 95% is percolated through a bed of zeolite particles, the mother liquor making it possible to obtain a limit exchange factor (LEF) for the zeolite particles of between 90 and 100%, (b) the percolation of the mother liquor is stopped when an amount of mother liquor has been used which makes it possible to obtain a mean real exchange factor (REF) such that: REF=LEF−2%±1%; and (c) the lithium-exchanged zeolite particles are recovered. The particles of faujasite, preferably X, zeolite exchanged to at least 88% with lithium cations and having an Si/Al ratio less than or equal to 1.5 which are obtained by such a manufacturing process can be used as adsorbent in a PSA, preferably VSA, process for separating or purifying a gas flow.

8 Claims, No Drawings

PROCESS FOR MANUFACTURING PARTICLES OF X ZEOLITE EXCHANGED WITH METAL CATIONS

FIELD OF THE INVENTION

The invention relates to a process for manufacturing X zeolites which are exchanged with lithium cations and are intended to be subsequently employed in a process of the PSA type, and more particularly of the VSA type, for separation of a gas flow, in particular a gas flow containing essentially oxygen and nitrogen, such as air.

BACKGROUND OF THE INVENTION

The gases in air, such as in particular oxygen and nitrogen, are very important industrially. At present, one of the non-cryogenic techniques used for producing these gases is the technique referred to as PSA (pressure swing adsorption), which encompasses not only PSA processes proper, but also similar processes, such as VSA (vacuum swing adsorption) or MPSA (mixed pressure swing adsorption) processes.

According to this PSA technique, when the gas mixture to be separated is air and the component to be recovered is oxygen, the oxygen is separated from the gas mixture using preferential adsorption of at least nitrogen on a material which preferentially adsorbs at least nitrogen and is subjected to cycles of given pressure in the separation zone.

The oxygen, which is adsorbed little or not at all, is recovered at the outlet of the separation zone; it has a purity, in general, higher than 90%, or even 93%.

More generally, a PSA process for the non-cryogenic separation of a gas mixture comprising a first compound which is adsorbed preferentially on an adsorbent material, and a second compound which is less preferentially adsorbed on the adsorbent material than the first compound, with a view to producing the second compound, cyclically comprises:

- a step of preferentially adsorbing at least the first compound on the adsorbent material, at an adsorption pressure referred to as the "high pressure", with recovery of at least some of the second compound produced in this way;
- a step of desorbing the first compound trapped in this way by the adsorbent, at a desorption pressure which is lower than the adsorption pressure and is referred to as the "low pressure";
- a step of recompressing the separation zone comprising the adsorbent, by progressively changing from the low pressure to the high pressure.

However, it is known that the separation efficiency for a gas mixture, such as air, depends on many parameters, in particular the high pressure, the low pressure, the type of adsorbent material used and its affinity for the compounds to be separated, the composition of the gas mixture to be separated, the adsorption temperature of the mixture to be separated, the size of the adsorbent particles, the composition of these particles and the temperature gradient set up inside the adsorbent bed.

At present, although it has not been possible to determine a general behaviour law, given that it is very difficult to relate these various parameters to one another, it is also known that the nature and properties of the adsorbent have an essential role in the overall efficiency of the process.

Currently, zeolites exchanged with metal cations are the adsorbents most widely used in PSA processes.

Such zeolite particles contain mono-, di-and/or trivalent metal cations, for example cations of alkali metals, alkaline-earth metals, transition metals and/or lanthanides, incorporated during the synthesis of the zeolite particles and/or inserted subsequently by an ion-exchange technique, that is to say, in general, by bringing unexchanged zeolite particles or raw zeolite into contact with a solution of one or more metal salts comprising the cation or cations to be incorporated into the zeolite structure, and subsequently recovering the particles of exchanged zeolite, that is to say zeolite containing a given quantity of metal cations.

The proportion of metal cations introduced into the zeolite structure, relative to the total exchange capacity, is referred to as the exchange factor, which is between 0 and 100%.

At present, the adsorbents most widely used in processes of the PSA type for separating gases, in particular air, are zeolites, in particular of the X or LSX type, highly exchanged, in general to more than 80% or even to more than 95%, with cations of very expensive metals, such as in particular lithium cations. Such zeolites are in particular described in documents EP-A-486384, EP-A-606848, EP-A-589391, EP-A-589406, EP-A-548755, U.S. Pat. No. 5,268,023, EP-A-109063 and EP-A-760248.

In the particular case of lithium, the lithium factor is the proportion of lithium cations which are associated with the aluminum in tetrahedral position contained in the zeolite phase of the particle and associated with exchangeable cations; this factor can be expressed by the Li/Al ratio.

Thus, documents U.S. Pat. No. 4,859,217 and 5,268,023 describe X or LSX (low-silica X) zeolites whose nitrogen adsorption capacity increases linearly as a function of the lithium-exchange factor for Li/Al ratios in excess of 80%. In other words, according to these documents, the best lithium exchange factor is the highest factor which can be obtained, namely 99% to 100% according to the examples given in U.S. Pat. No. 4,859,217.

Furthermore, documents U.S. Pat. No. 5,174,979 and U.S. Pat. No. 5,413,625 describe an X or LSX zeolite having an Li/alkaline-earth metal ratio of between 95:5 and 35 50:50. In order to achieve the maximum lithium-exchange factor, the zeolites described in these documents are prepared with heavy consumption of lithium salts, that is to say consumption of between 6 and 12 times the stoichiometric amount needed for complete exchange of the exchangeable cations which are associated with the aluminum of the zeolite phase.

However, contrary to what the prior art suggests, in the zeolite phase of the adsorbent particles there are a certain number of cations other than sodium and lithium, which originate in particular from the synthesis reagents and/or the binder used for manufacturing the particles.

The inventors of the present invention have demonstrated that these other cations are, in general, more difficult to exchange than the sodium cations.

In other words, substitution of these cations with lithium cations is relatively difficult and therefore causes overconsumption of the mother liquor containing the sodium salts, which results in a significant increase in the manufacturing costs of the adsorbent particles.

The consequence of this is that the real exchange factor (REF) which is obtained after ion exchange is not 99% or 100%, as suggested by the prior art, in view of the presence of these cations other than lithium and sodium in the zeolite phase.

It is therefore far preferable, in particular from the point of view of manufacturing costs, to manufacture zeolite particles having a real exchange factor (REF) lower than the maximum exchange factor described by the prior art.

However, for each mother salt containing lithium salts, there is a limit (LEF) or maximum exchange factor which can be obtained for the zeolite particles subjected to an ion-exchange process using this mother liquor.

SUMMARY OF THE INVENTION

The object of the present invention is therefore to provide a process for manufacturing an adsorbent exchanged with metal cations which makes it possible to obtain the optimum, not only in terms of the efficiency of the adsorbent when it is used in a PSA process, but also in terms of the ion-exchange yield during the manufacture of this adsorbent.

The present invention therefore relates to a process for manufacturing particles of type X zeolite having an Si/Al ratio less than or equal to 1.5 and exchanged with at least lithium ions, in which:

a) at least one mother liquor containing lithium salts having a molar purity in excess of 98% is percolated through at least one bed of zeolite particles, the mother liquor making it possible to obtain a limit exchange factor (LEF) for the zeolite particles of between 90 and 100%, b) the percolation of the mother liquor is stopped when an amount of mother liquor has been used which is necessary to obtain a mean real exchange factor (REF) such that: REF=LEF−2%±1% c) the lithium-exchanged zeolite particles obtained in step b) are recovered.

In the context of the present invention, the term LEF is used to denote the zeolite's limit exchange factor obtained on average by passing at least 6 times the stoichiometric amount, preferably at least 10 to 100 times the stoichiometric amount, of a lithium salt solution through a bed of particles of the zeolite, which bed is contained in an ion-exchange column, and at the industrial exchange temperature, that is to say in the region of 100° C. Preferably, the limit exchange factor (LEF) is expressed as a function of the Li/Al ratio (in %) in the zeolite phase and as a function of the ratio Li/(Li+Na) in the bead formed by aggregating at least one zeolite phase and at least one binder. In general, the LEF is not equal to 100% owing to the presence of impurities in the mother liquor containing the lithium salt and in the zeolite itself.

Depending on the case, the manufacturing process according to the invention may include one or more of the following characteristics:

the mother liquor has a purity of from 98% to 99.9%, preferably from 99.3% to 99.8%.

the LEF is between 93% and 99%.

the REF is between−90% and 98%.

the ion exchange is carried out at a temperature of between 700° and 140° C., preferably of the order of 100° C.

the zeolite is a faujasite, preferably an 5 X zeolite having an Si/Al ratio of the order of 1.

The invention furthermore relates to particles of faujasite zeolite, preferably type X or LSX, exchanged to at least 88% with lithium cations and having an Si/Al ratio less than or equal to 1.5, characterized in that they can be obtained by the manufacturing process mentioned above.

Advantageously, the particles are used as adsorbent in a process for separating or purifying a gas flow, preferably a separation process of the PSA, preferably VSA, type, for separating a gas flow containing at least one first compound which is adsorbed preferentially on at least one adsorbent, and at least one second compound which is adsorbed less preferentially on at least the adsorbent than the first compound.

Preferably, the gas flow to be separated comprises nitrogen and at least one less polar compound and, preferably, the gas flow is air and the less polar compound is oxygen; the air being, in the context of the present invention, the air contained inside a building or a heated or unheated chamber, or the outside air, that is to say under atmospheric conditions, taken as it comes or optionally pretreated.

the first compound is nitrogen and the second compound is oxygen; and an oxygen-rich gas flow is produced, that is to say one generally comprising at least 90% to about 95% of oxygen.

the high pressure for adsorption is between $10^5$ Pa and $10^7$ Pa, preferably of the order of $10^5$ Pa to $10^6$ Pa, and/or the low pressure for desorption is between $10^4$ Pa and $10^6$ Pa, preferably of the order of $10^4$ Pa to $10^5$ Pa.

the feed temperature is between 10° C. and 80° C., preferably between 25° C. and 60° C.

The invention furthermore relates to a device capable of carrying out a PSA process, such as the process described above, comprising at least one adsorber and, preferably, from 1 to 3 adsorbers. It should be noted that the present invention also applies to each of the adsorbers of a process employing several adsorbers, for example a multibed process.

DETAILED DESCRIPTION OF THE INVENTION

The invention will now be described in more detail with the aid of examples which are given by way of illustration but without implying any limitation.

EXAMPLE 1

Particles (tests A to E) of the same aggregated type X zeolite are subjected to several ion exchanges with mother liquors of lithium chloride having variable purity (between 0% and 99.995%) and in great excess, for example at least 100 stoichiometric amounts in this example.

After ion exchange, the particles are collected, and their composition is determined by the ICP-AES (Induced Coupled Plasma-Atomic Emission Spectroscopy) technique.

The results obtained are given in Tables I and II below.

TABLE I

Composition of the zeolite particle (zeolite + binder)

| Particles No. | Purity of the mother liquor | Li (in % by equiv.) | Na (in % by equiv.) | Mg (in % by equiv.) | Ca (in % by equiv.) | K (in % by equiv.) |
|---|---|---|---|---|---|---|
| A | 0% | 0.00 | 77.98 | 14.27 | 6.13 | 1.63 |
| F | 30% | 11.02 | 70.91 | 13.40 | 4.45 | 0.22 |
| G | 59% | 27.93 | 53.81 | 13.02 | 4.91 | 0.33 |
| H | 77% | 42.26 | 38.75 | 13.32 | 5.32 | 0.35 |
| B | 90% | 60.12 | 20.26 | 13.61 | 5.37 | 0.64 |
| C | 95% | 67.23 | 13.00 | 13.90 | 5.28 | 0.58 |
| D | 99.9% | 80.37 | 1.57 | 13.05 | 4.51 | 0.50 |
| E | 99.995% | 81.69 | 0.02 | 13.53 | 4.44 | 0.32 |

TABLE II

Composition of the zeolite phase

| Zeolite No. | Purity of the mother liquor | Li (in % by equiv.) | Na (in % by equiv.) | Mg (in % by equiv.) | Ca (in % by equiv.) | K (in % by equiv.) |
|---|---|---|---|---|---|---|
| A | 0% | 0.00 | 96.02 | 0.28 | 2.28 | 1.42 |
| B | 90% | 70.70 | 23.91 | 0.81 | 4.15 | 0.43 |
| C | 95% | 79.40 | 15.74 | 0.67 | 3.88 | 0.32 |
| D | 99.9% | 91.29 | 3.72 | 0.17 | 4.41 | 0.41 |
| E | 99.995% | 96.33 | 0.00 | 0.57 | 3.07 | 0.03 |

In view of Tables I and II, it can clearly be seen that, even when an extremely pure solution (test E at 99.995%) is used, about 3% of calcium cations still remain in the zeolite phase, together with a few magnesium and/or potassium cations.

Industrially, however, it is only possible to use mother liquors containing lithium salts, such as lithium chloride, having a molar purity of between 95% and 99.9%.

Consequently, industrial-scale manufacture of particles of X zeolite exchanged to 99% or 100% is not always possible, contrary to what the prior art teaches, and there is therefore a limit exchange factor which depends on the unexchanged zeolite used, the mother liquor employed and the amount of mother liquor consumed (here 100 stoichiometric amounts) and, more generally, the exchange conditions, in particular temperature, number of exchange columns, etc.

EXAMPLE 2

Particles of aggregated X zeolite are subjected to an ion-exchange process. More precisely, a mother liquor containing lithium chloride with a purity equal to about 99.6% (industrial solution) at 1.7N is percolated through a bed of the particles of X zeolite at a temperature of 100° C., by passing through an amount of solution equal to 4 times the stoichiometric amount.

The zeolite particles are then recovered and homogenized in terms of composition. After analyzing the particles, it is found that the real exchange factor (REF) is about 95%.

However, powerful exchange (100 stoichiometric amounts) shows that a limit exchange factor (LEF) of 97% can be achieved (with LEF =Li/(Li+Na)), that is to say REF=LEF−2%.

This difference may in fact result from the purity and/or the amount of mother liquor used.

EXAMPLE 3

Zeolite particles having a variable exchange factor (cf. Table III below) are used as adsorbent in a VSA type adsorption process for separating the gases in air, in order to produce oxygen having a purity of about 93%. In these tests, the working conditions of the VSA process are as follows:

2 adsorbers operating in parallel adsorption pressure: $1.4 \times 10^5$ Pa desorption pressure: $0.4 \times 10^5$ Pa temperature of the feed air: approximately 35° C. production cycles: 2×40 seconds

TABLE III

| Test No. | REF (in %) | Energy index | Investment index | Overall $O_2$ cost index |
|---|---|---|---|---|
| 1 | 90.5 | 100.0 | 100.0 | 100.0 |
| 2 | 94.0 | 98.4 | 97.5 | 98.0 |
| 3 | 95.0 | 98.1 | 97.0 | 97.6 |
| 4 | 95.9 | 97.8 | 101.0 | 99.1 |
| 5 | 97.0 | 97.6 | 112.0 | 109.0 |

In view of Table III, it can be seen that the limit exchange factor LEF is 97% (test 5) and that the most satisfactory results in terms of the performance of the VSA process are obtained for a real exchange factor (REF) of 95% (test 3) and not when REF=LEF=97%.

In other words, for a given lithium chloride solution, it is expedient to define exchange conditions sufficient to obtain an REF 2% below the LEF.

The present invention is not limited to the field of producing oxygen from air and may accordingly be applied to the separation of other gas flows, such as in particular flows containing hydrogen, carbon dioxide and/or carbon monoxide, in particular to the production of synthesis gas or "syngas".

What is claimed is:

1. Process for manufacturing particles of type X zeolite exchanged with at least lithium cations and having an Si/Al ratio less than or equal to 1.5, which consists essentially of:

a) percolating at least one mother liquor containing lithium salts having a molar purity in excess of 95% through at least one bed of zeolite particles, said mother liquor having a limit exchange factor (LEF) for said zeolite particles of between 90 and 100%;

b) stopping the percolation of said mother liquor when an amount of mother liquor has been used which is necessary to obtain a mean real exchange factor (REF) such that:

REF=LEF−2%±1% c) recovering the lithium-exchanged zeolite particles obtained in step b).

2. Process according to claim 1, wherein the mother liquor has a purity of from 98% to 99.9%.

3. Process according to claim 2, wherein the mother liquor has a purity of from 99.3% to 99.9%.

4. Process according to claim 1, wherein the LEF is between 90% and 99%.

5. Process according to claim 1, wherein the REF is between 88% and 98%.

6. Process according to claim 1, wherein the ion exchange is carried out at a temperature of between 70° and 140° C.

7. Process according to claim 6, wherein the ion exchange is carried out at a temperature of about 100° C.

8. Process according to claim 1, wherein the zeolite has an Si/Al ratio of about 1.

* * * * *